Figure 1:
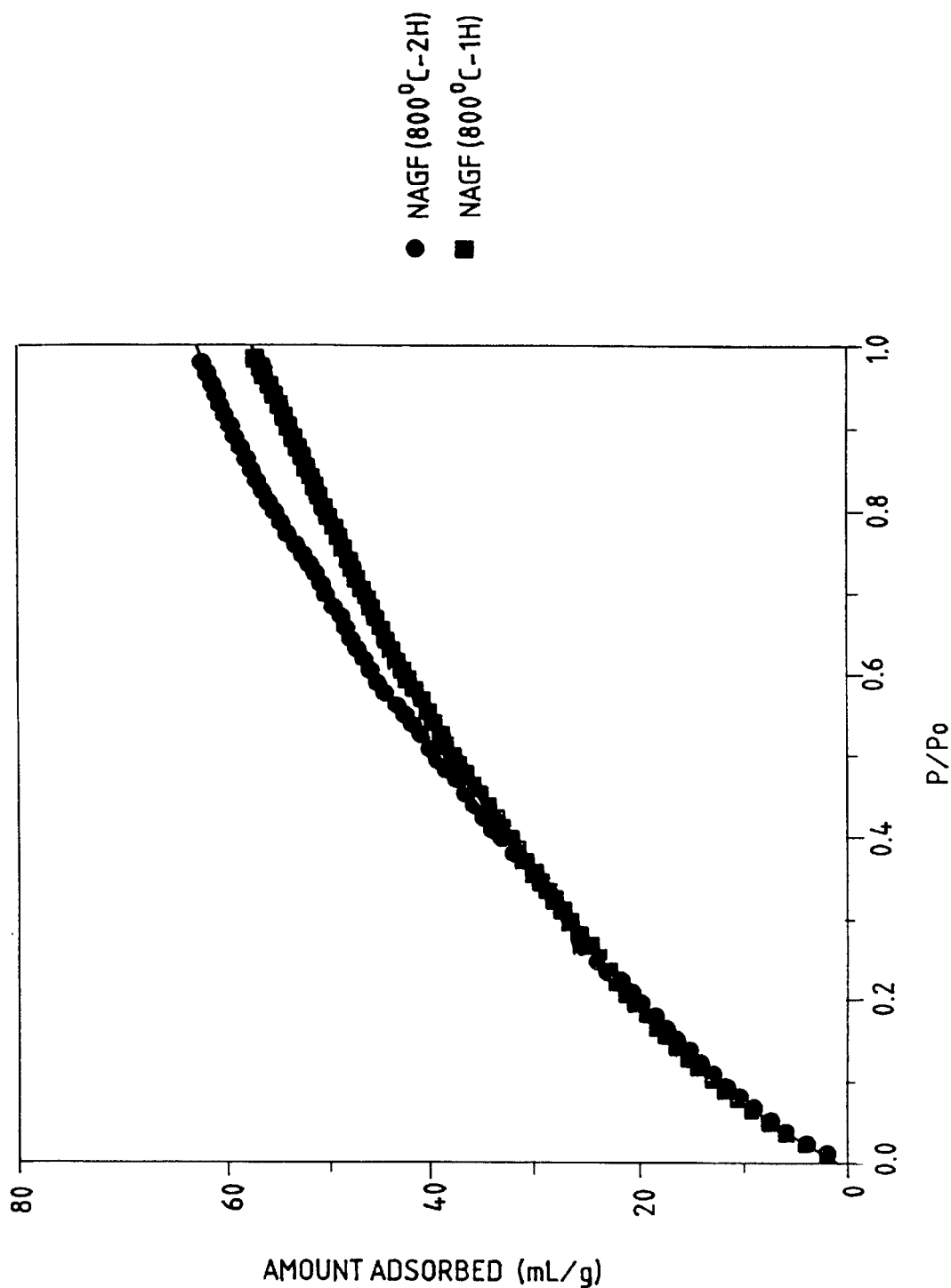

United States Patent [19]

Economy et al.

[11] Patent Number: 5,834,114
[45] Date of Patent: Nov. 10, 1998

[54] COATED ABSORBENT FIBERS

[75] Inventors: James Economy, Urbana; Michael Daley, Champaign, both of Ill.

[73] Assignee: The Board of Trustees of the University of Illinois, Champaign, Ill.

[21] Appl. No.: 456,197

[22] Filed: May 31, 1995

[51] Int. Cl.⁶ .............................. B32B 9/00; B05D 3/02; B05D 3/04; C01B 31/08
[52] U.S. Cl. .................. 428/368; 264/29.1; 264/29.6; 264/29.7; 423/447.4; 423/447.6; 423/447.7; 423/447.8; 427/228; 427/244; 427/377; 427/381; 427/389.8; 428/378; 428/408; 428/426
[58] Field of Search ................................ 427/228, 244, 427/377, 381, 389.8, 393.3, 333, 342, 224, 374.4, 374.6; 428/426, 228, 368, 378, 408, 367; 264/29.1, 29.3, 29.2, 29.6, 29.7, 29.4; 423/447.2, 447.4, 447.6, 447.7, 447.8, 460

[56] References Cited

U.S. PATENT DOCUMENTS

| | | |
|---|---|---|
| 3,395,970 | 8/1968 | Machell . |
| 3,542,582 | 11/1970 | Degginger ............................. 427/224 |
| 3,676,173 | 7/1972 | Adams .................................. 427/244 |
| 3,903,220 | 9/1975 | Economy et al. ................... 423/447.4 |
| 3,971,669 | 7/1976 | Wrzesien et al. ..................... 427/412 |
| 4,100,314 | 7/1978 | Wallouch ............................. 427/228 |
| 4,178,413 | 12/1979 | DeMunda .............................. 427/227 |
| 4,321,154 | 3/1982 | Ledru .................................... 252/62 |
| 4,550,015 | 10/1985 | Korb et al. ........................... 264/29.7 |
| 4,828,882 | 5/1989 | Tsezos et al. ......................... 247/213 |
| 4,917,835 | 4/1990 | Lear et al. ............................ 264/29.1 |
| 4,983,451 | 1/1991 | Sugino et al. ......................... 156/148 |
| 5,026,402 | 6/1991 | Bose et al. ............................. 427/115 |
| 5,063,042 | 11/1991 | Arita et al. .......................... 423/447.4 |
| 5,277,802 | 1/1994 | Goodwin .............................. 210/443 |
| 5,320,870 | 6/1994 | Sorathia et al. .................... 427/393.3 |
| 5,376,407 | 12/1994 | Feldman et al. ...................... 427/228 |
| 5,389,325 | 2/1995 | Bookbinder et al. ............. 264/177.12 |
| 5,451,444 | 9/1995 | DeLiso et al. ......................... 428/116 |
| 5,487,917 | 1/1996 | Gadkaree ............................. 427/228 |
| 5,512,351 | 4/1996 | Miyamichi et al. ................... 427/228 |
| 5,589,299 | 12/1996 | Yamada et al. ....................... 427/122 |
| 5,707,471 | 1/1998 | Petrak et al. .......................... 427/226 |

FOREIGN PATENT DOCUMENTS 1415853  11/1975  United Kingdom .................. 427/224

OTHER PUBLICATIONS

Economy et al, Adsorption Characteristics of Activated Carbon Fibers, Applied Polymer Symposium No. 29, 199–211 (1976) (no month).

Lin et al., Preparation and Properties of Activated Carbon Fibers Derived from Phenolic Precursor, Applied Polymer Symposium No. 21, 143–52 (1973) (no month).

Andreopoulos et al., Thermally Activated Phenolic Fibers, Chemistry of Materials, 1991, 3 (1991) (no month).

Economy et al., Tailoring Carbon Fibers for Adsorbing Volatiles, Chemtech 597–603 (Oct., 1992).

*Primary Examiner*—Diana Dudash
*Attorney, Agent, or Firm*—Gardner, Carton & Douglas

[57] ABSTRACT

Fiber material for adsorbing contaminants is prepared according to the steps of preparing coating a glass or mineral fiber substrate with a resin, cross-linking the resin, heating the coated fiber substrate and resin to carbonize the resin, and exposing the coated fiber substrate to an etchant to activate the coated fiber substrate.

27 Claims, 5 Drawing Sheets

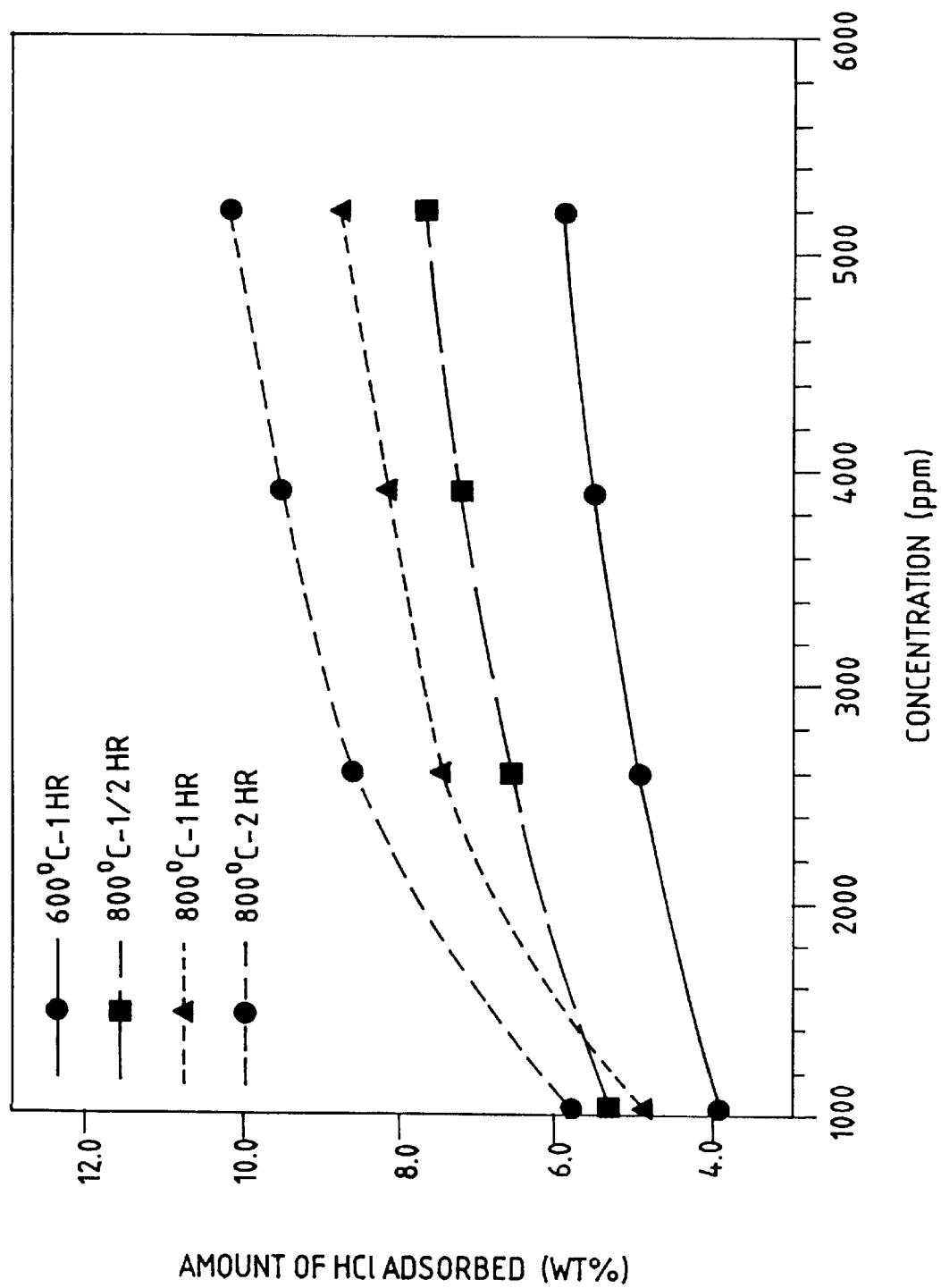

COATED ABSORBENT FIBERS

I. GOVERNMENT RIGHTS

This invention was made with Government support under awarded Contract DMR-9208545 by the National Science Foundation. The Government has certain rights in this invention.

II. FIELD OF THE INVENTION

The present invention relates to the use of certain activated materials to adsorb noxious substances in gaseous and liquid waste streams.

III. BACKGROUND OF THE INVENTION

Concern for the environment has caused government, science and industry to seek out new solutions for removing toxic and noxious materials ("contaminants") from air and water, and especially from waste streams. In particular, contamination of air with pollutants such as ClO (which depletes the ozone layer), $CO_2$, $NO_x$, $SO_x$, CO, $CH_4$, and localized $O_3$ has become a problem near industrial sites, in large urban centers, and in areas down wind of such places, where pollutants are carried by weather patterns and returned to earth as, for example, acid rain. Water pollution, including soil and groundwater contamination, also presents a serious environmental hazard.

Science has advanced in its ability to detect increasingly small quantities of contaminants. Thus, we now are able to detect the adverse consequences resulting from the presence of even minute quantities of certain such contaminants. For example, small amounts of contaminants such as PCBs and dioxin are known to cause adverse health effects in animals and in humans. Other contaminants, such as $CO_2$ and methane, have been held responsible for global warming. Still other contaminants, like CO, are of concern to people in their homes, as well as more generally, because CO is present in the emission streams of automobiles and cigarettes. And chlorofluorocarbons, used as refrigerants and in the production of certain types of foams, have been found partly responsible for depleting the ozone layer that protects the earth and its inhabitants from the effects of ultraviolet radiation.

Government regulation of contaminant emission has resulted in mandates for the virtual elimination of certain contaminants, and in limitations upon the emission of other contaminants, in order to protect the environment in general, and human health in particular. For example, international accords have been reached to mandate the elimination of chlorofluorocarbons from industry because of their adverse effects on the environment and, in turn, human health.

Science and industry, too, have proposed solutions to the problems posed by contaminants, in order to permit valuable technologies to be utilized despite the generation of contaminants by those technologies. Where the contaminants are present in waste streams, these solutions principally are directed to the creation of mechanisms to remove the contaminants. These mechanisms include devices such as scrubbers, filters, and other mechanical and chemical systems for removing contaminants from waste streams. Such devices have been responsible for great decreases in the level of contaminants found in waste streams. Such devices may not, however, be cost effective to limit the amount of a noxious substance found in a particular waste stream. Indeed, the utility of such devices depends upon the particular contaminants involved, the amount of such material present in the waste stream, the acceptable level of such materials in the environment (which frequently is determined by government regulation), and the costs and benefits achieved from the various options available to diminish the quantity of contaminants to acceptable levels while still permitting the commercial utilization of the underlying technology responsible for the waste stream.

Such solutions have not, however, been as effective as needed to remove minute quantities of contaminants. Typically, activated carbon granules (produced from organic precursors such as coal, wood, almond shells, coconut shells, etc.) or fibers (produced from organic and synthetic fiber precursors) have been employed to create sites where such substances can be adsorbed as a waste stream passes through a filter made from such activated carbon materials. Such activated carbon materials are frequently produced from synthetic fibers of materials such as phenolic resins, such as resols and novolacs, which are treated with superheated $CO_2$ or steam to carbonize and activate the material and to increase the surface area of the material by creating pores in the materials.

Activated carbon materials typically have been most effective in removing undesired substances having a pH above 7.0, because the activation process in carbon tends to create sites that are slightly acidic (pH<7.0). Thus, activated carbon materials have not been particularly effective in removing such important, acidic pollutants as $NO_x$ and $SO_x$. However, a variety of chemical treatments of such fibers have been proposed to create differentiated surfaces capable of adsorbing many different contaminants.

The processes for producing activated carbon fibers also have been limited as a result of the extreme weight losses realized in the production of such fibers. Weight loss is an important limitation on the cost-effectiveness of such fibers because it correlates inversely with the amount of contaminant that can be adsorbed upon the surface of the fiber. The technique of carbonizing the synthetic precursors to such fibers also produces materials that are brittle or frangible, limiting their utility to systems in which some type of structural support or containment for such fibers is permitted. This tends to increase the cost of using the activated carbon fibers. Moreover, conventional activated carbon fibers exhibit poor mechanical properties, and are unavailable or expensive to produce in forms such as woven fabrics, felts, or papers.

IV. SUMMARY OF THE INVENTION

The present invention provides a fiber material for adsorbing contaminants that overcomes the problems described above, and that offers greater flexibility in applications. The fiber material can be made by coating a fiber substrate with a resin, cross-linking the resin, heating the coated fiber substrate to carbonize the resin, and exposing the coated fiber substrate to an etchant to activate the resin.

Thus, it is an object of the invention to provide a method for making an adsorbent material suitable for use in a wider variety of application than convention fibers because of superior mechanical properties.

Another object of the invention is to provide a lower cost method of producing such adsorbent materials.

Still another object of the invention is to provide such materials in forms suitable for use as extremely high efficiency filters.

These and other objects of the invention are described in greater detail below, with reference to specific examples and embodiments of the invention.

V. BRIEF DESCRIPTION OF THE DRAWINGS

Figure 2:
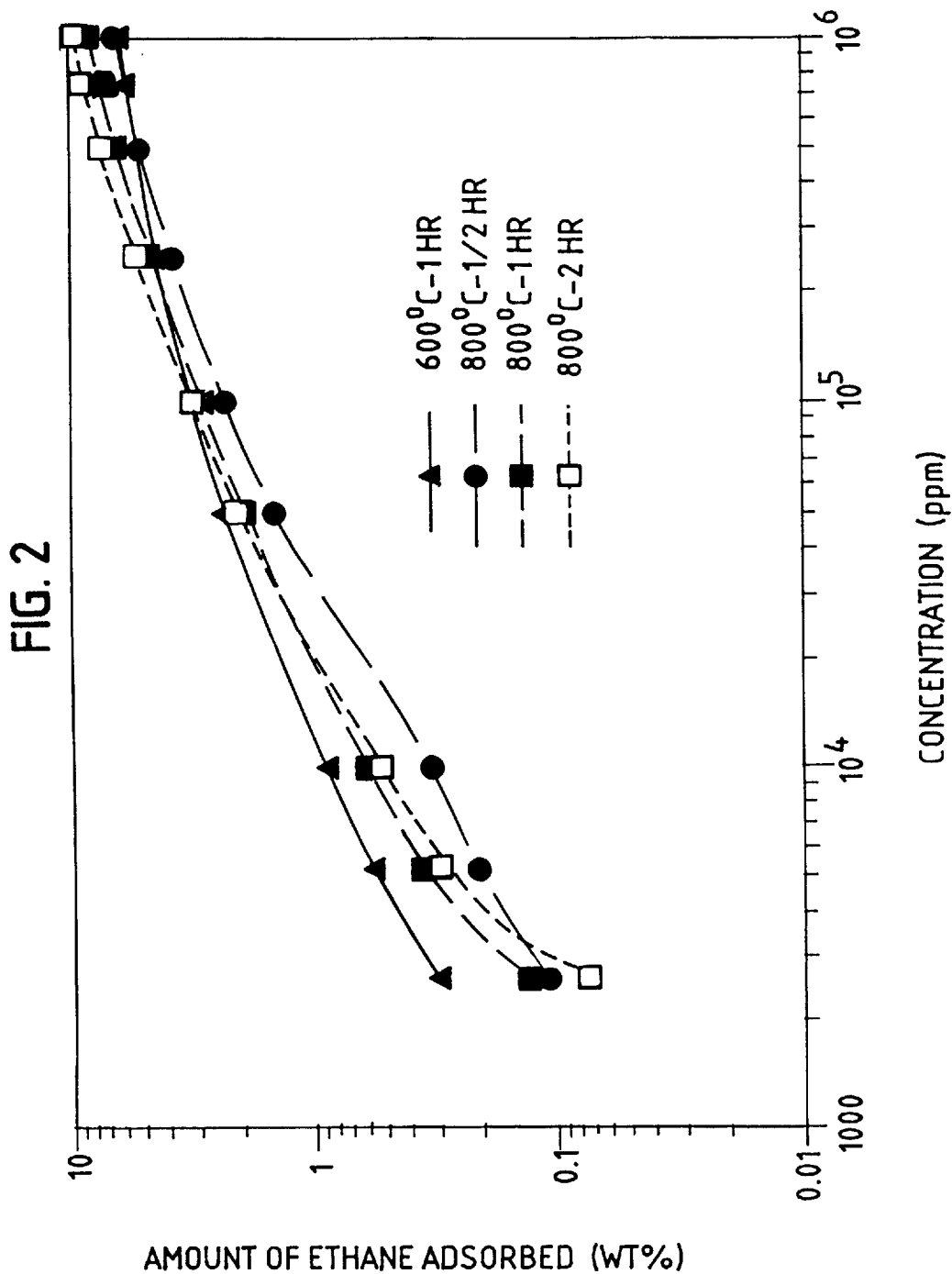
Figure 3:
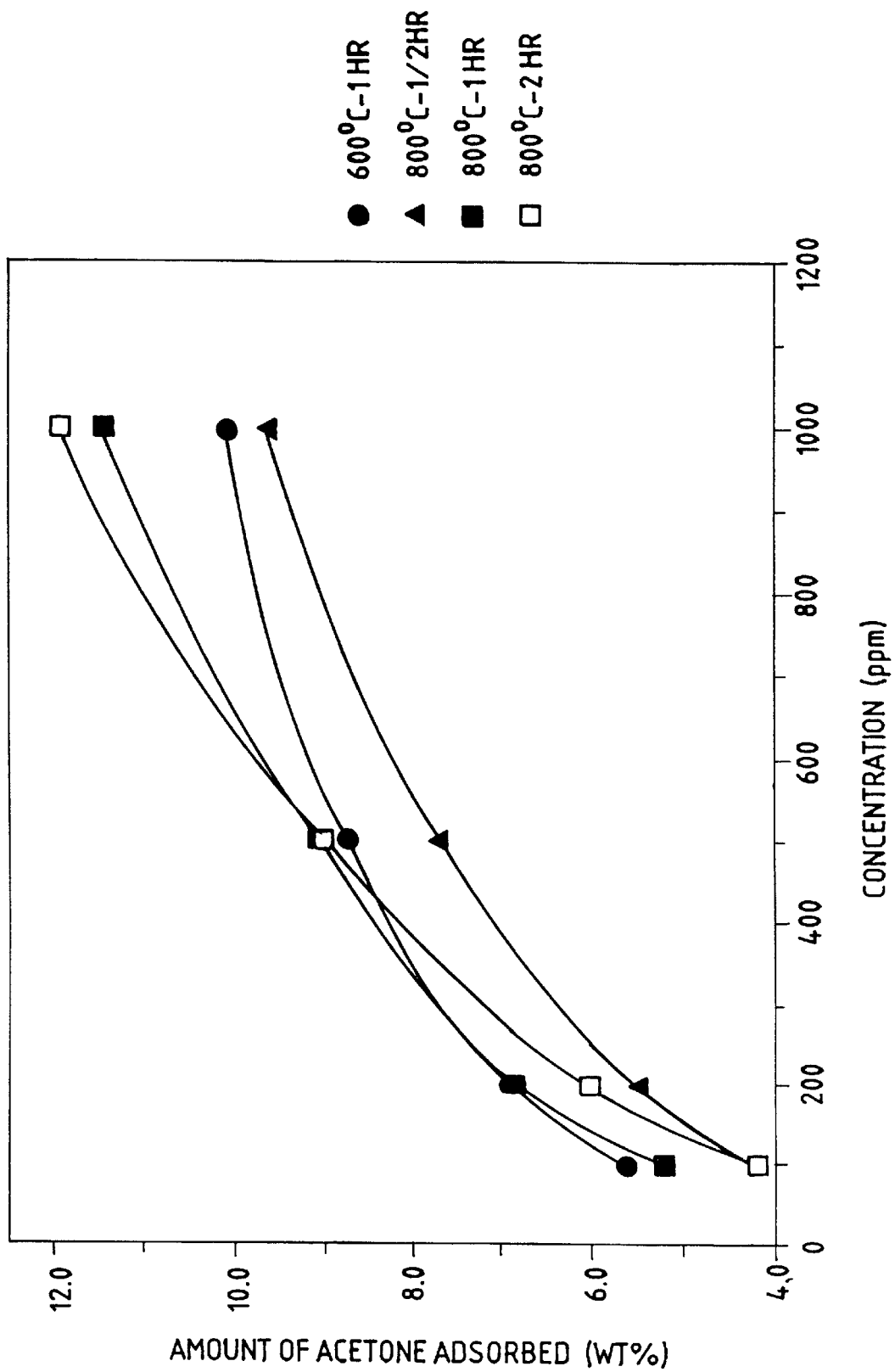
Figure 4:
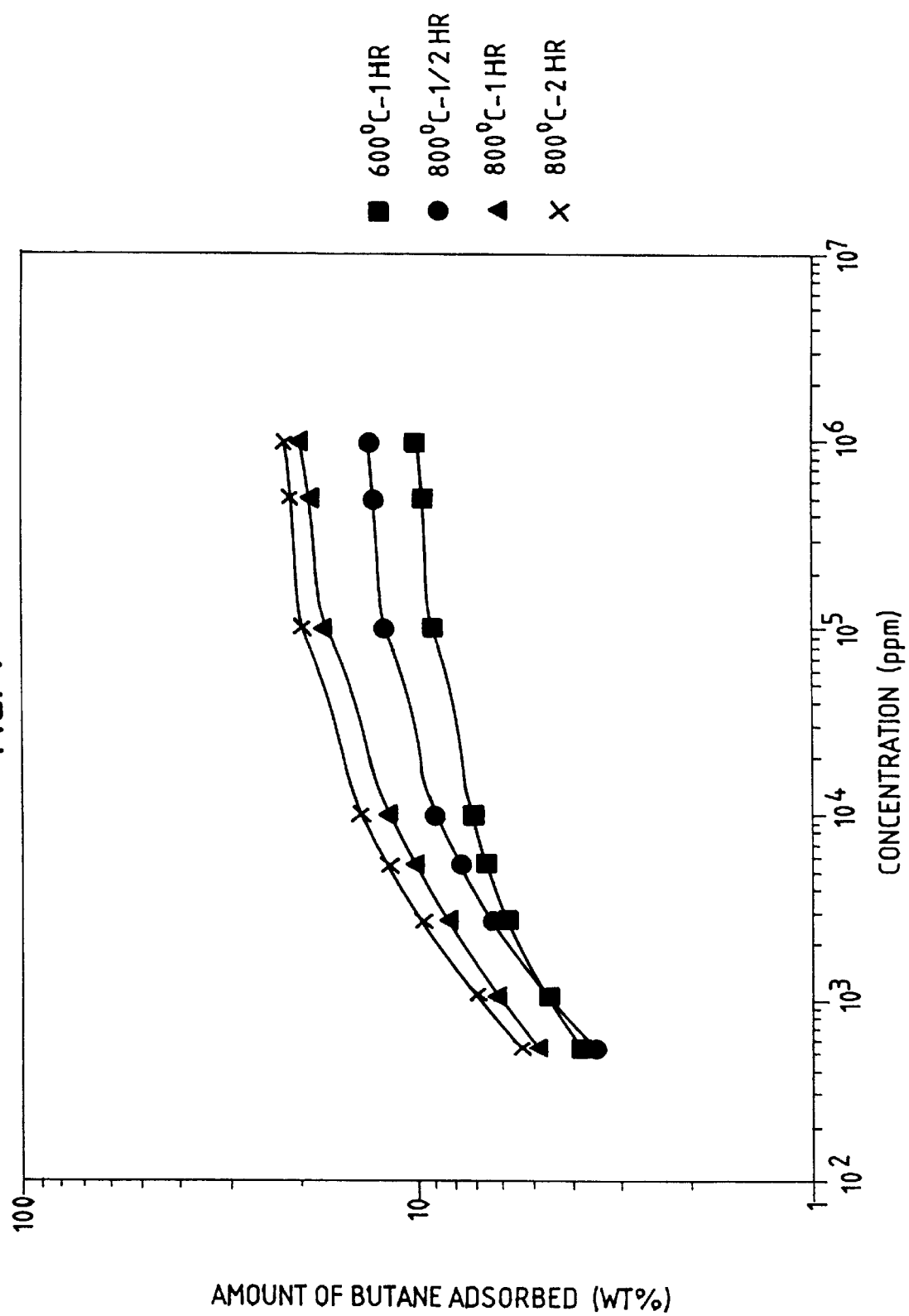

FIGS. 1–5 are adsorption isotherms illustrating the efficiency of the materials made according to the invention for adsorption of $CO_2$, ethane, acetone, butane and HCl.

VI. DETAILED DESCRIPTION OF THE INVENTION

The invention employs a phenolic resin in the form of a low viscosity melt, or in a solution (such as an ethanol solution). The resin may be a novolac resin, a resol, or a low viscosity pitch, but other resins that will produce a reasonable concentration of chars (as low as 10% by weight) also may be used in order to achieve certain desirable characteristics in the final product. The resin or resin solution is exposed to a suitable cross-linking agent (which are generally known in the art to include resols, hexamethylenetetramine, and mixtures of hydrochloric acid with formaldehyde, but also may be air (depending upon the resin employed)). Thus, for example, one may employ an ethanol solution of a novolac resin and 5–14% by weight of a cross-linking agent such as hexamethylenetetramine.

The resin (and, where combined in solution or mixture, the cross-linking agent) is applied to coat an inert fiber substrate (such as a substrate made from glass fibers or mineral fibers), which may take the form of a woven or nonwoven fabric, a felt, or even paper. The fiber substrate material is coated preferably by dip coating, vacuum impregnation, or spraying. The coated fiber then is cured in a conventional manner to trigger the cross-linking reaction, as for example, by heating to about 165° C. if the cross-linking agent is hexamethylenetetramine. (If a phenolic resin solution is employed, the solvent must first be removed by heating the coated substrate to a temperature sufficiently high to volatilize the solvent.) Curing may take place in one or more steps over a succession of temperatures, in order to increase the concentration of chars in the coating and minimize the amount of coating that is volatilized.

The cured, coated material then is activated to produce an activated carbon-coated assembly by processing the material in a heated environment containing an etchant, according to any of several techniques discussed below. The specific technique employed will vary, depending upon the desired pore size and surface chemistry in the final material to be produced. The activation temperature and time, along with the etchant, will determine the specific pore size and surface chemistry. In general, increase in activation temperature and/or time will produce a surface having a larger pore size than a correspondingly lesser activation temperature and/or time. Likewise, if the etchant is selected to produce a chemically active fiber (designed to selectively adsorb acidic or basic contaminants, for example), increasing the flow rate of the etchant increases the concentration of chemically active species in the fiber.

Thus, to produce a fiber assembly having basic surface chemistry (which is desirable for adsorption of acidic contaminants), the coated material is activated in ammonia (or a mixture of nitrogen and hydrogen) at 400°–900° C. for a period of time ranging from minutes to hours, depending upon the desired pore size. The resulting assemblies have B.E.T. surface areas ranging from 400–1600 $m^2/g$ calculated based upon the weight percent of resin coating. The use of ammonia as an etchant produces a material with a coating having a nitrogen content from about 1–10% by weight.

Similarly, to produce materials having an acidic surface chemistry, and a pore size of less than about 7 Å, the coated material is activated in air at 300°–450° C. for several minutes to several hours. Once again, the pore size increases with increased activation temperature and/or time. The resulting fibers have B.E.T. surface areas ranging from 50–650 $m^2/g$. The use of air as the etchant produces a fiber with a coating that is 20–30% oxygen by weight. Other oxidants (such as mixtures of sulfuric and nitric acids, or mixtures such as hydrogen peroxide and acetic acid) also may be used as etchants to create acidic surface chemistries.

Weakly acidic chemistries also can be produced using the present invention by using steam or $CO_2$ as the etchant. The coated fibers are activated in steam or carbon dioxide at 600°–900° C. for several minutes to several hours, and, as above, the pore size will increase in relation to increased activation time and/or temperature. Fibers produced using this embodiment of the invention are believed to exhibit B.E.T. surface areas ranging from about 600–2800 $m^2/g$ and an oxygen content of 0–5% by weight.

Inert gases, such as argon or nitrogen, also may be used to activate the coating applied to the fiber substrate. It is believed that such inert gases activate the coating by causing the coating to tent over the fiber matrix (which prevents the coating from shrinking upon heating). In this embodiment, the coated fibers are placed in a high temperature environment (above 600° C.) under a flow of inert gas, and held for a period of time sufficient to create pores of a desired size.

Pores also may be created in the coating by other techniques. For example, soluble inorganic compounds, in the form fine particulates (on the order of 1 $\mu$m), may be dispersed within the resin prior to coating. Such inorganic materials must, in order to be used in the invention, remain stable through at least the curing step of the process for making the coated fibers, and if an etching step also is used for the particular embodiment, must be stable through the etching step. Thereafter, the coated materials containing the soluble inorganic matter is placed in a solvent to dissolve the soluble inorganic material. The solvent must be selected to avoid degrading or dissolving the phenolic resin coating.

Likewise, one or more polymers in addition to the resin that is used for coating the fibers may be added to the coating. These polymers are selected because they degrade or volatilize at lower temperatures (such as poly(ethylene oxide)) than the resin coating. Following the curing step, these materials are volatilized, usually by degradation processes, leaving behind pores of a size determined by the particular polymer employed and the concentration of the polymer.

Finally, the resin coating may include one or more metals (in trace amounts) that are used to catalyze chemical reaction. For example, such metals as chromium, copper, titanium, or nickel may be included in the resin prior to coating, to catalyze the decomposition of toxic gases. The metals also may be added after activation by coating the fibers with a mixture of catalyst and a solvent, and then vaporizing the solvent. This would be particularly advantageous where the coated fibers are used in devices such as gas masks to adsorb gases employed in chemical warfare.

Thus, in general, it may be desirable to produce a fiber having a coating with small pore sizes for use in adsorbing extremely small molecules, such as (for example) $CH_4$, Rn, $NH_3$, $SO_x$, and HCl. The surface chemistry variations permitted by the present invention can also be manipulated, along with the pore size, to produce fibers tailored to adsorb specific contaminants.

Examples illustrating the method of making fibers according to the invention, and the benefits obtained thereby, are set forth below.

EXAMPLE I 52.95 g of novolac (GP2006) were mixed with 5.92 g hexamethylenetetramine, and then dissolved in 73.11 mL ethanol to make a solution of 48/50 weight percent resin. Preweighed samples of fiberglass reinforcement (plast #257) made of woven S2 glass fibers were dipped into the resin solution and cured in a tube furnace under argon at a flow rate of 130–200 mL/min. The coated fiberglass was heated in the furnace to 100° C. for 20 min to remove the solvent. The coated fiberglass then was cure, first by heating the coated fiberglass to 150° C. for 20 min, and for an additional 20 min. Descriptions of the samples so produced are set forth in Table I.

TABLE I

| Sample No. | Weight of Uncoated Fiberglass | Weight of Coated Fiberglass, After Curing | Weight % Resin |
|---|---|---|---|
| 1 | 0.7313 | 1.0501 | 30.4 |
| 2 | 0.623 | 0.3085 | 33.09 |
| 3 | 0.7948 | 1.2129 | 34.47 |
| 4 | 0.8819 | 1.3295 | 33.67 |
| 5 | 0.6923 | 0.8899 | 22.2 |
| 6 | 0.7904 | 1.0403 | 23.4 |
| 7 | 0.7098 | 0.9269 | 23.4 |
| 8 | 0.8400 | 1.1429 | 26.5 |
| 9 | 0.7648 | 1.0879 | 29.6 |
| 10 | 0.5588 | 0.8190 | 31.77 |
| 11 | 0.4898 | 0.7571 | 35.31 |

It has been found that impregnation of more than 35% resin by weight limits the flexibility of woven coated material; however, for nonwoven materials, substantially more resin (up to about 60% by weight resin) may desirably be employed.

The coated fiberglass then is activated by exposing the fiber to ammonia at a high temperature to produce a very high surface area carbon fiber with basic surface chemistry permitting adsorption of acidic contaminants. Activation is accomplished by placing the coated fiberglass in a tube furnace or other similar heating device and flowing ammonia over the material while heating it. This has the effect of etching the coating to produce a basic, microporous coated assembly which retains most of its weight, and exhibits a marked increase in surface area and nitrogen content, revealing the basic surface chemistry of the fiber. An example of the etching process and its results follows.

EXAMPLE II

Samples of phenolic-coated glass fiber material, ranging in mass from 0.6–0.9 g, were placed in a tube furnace and heated in ammonia at a flow rate of 200 mL/min until reaching 600°–800° C. and held at that temperature for a predetermined time. The samples were then cooled, and held at 200° C. for two hours. The characteristics of the samples are set forth in Table II.

TABLE II

| Sample No. | Reaction Temp. (°C.) | Reaction Time (hrs) | Weight Loss (g) | Original Resin Weight (g) | Activation Yield (%) |
|---|---|---|---|---|---|
| 1 | 600 | 1 | 0.0929 | 0.2262 | 58.9 |
| 2 | 700 | 1 | 0.0929 | 0.2079 | 55.32 |
| 3 | 800 | 0.5 | 0.0766 | 0.1573 | 51.3 |
| 4 | 800 | 1 | 0.1248 | 0.2166 | 42.38 |
| 5 | 800 | 2 | 0.1523 | 0.2330 | 34.64 |

The surface area of each of these samples was measured using nitrogen adsorption techniques at 77° C. with a Micromeritrics ASAP 2400 and elemental analysis techniques using a Control Equipment Corp. 240XA elemental analyzer. The results of those analyses is set forth in Table III.

TABLE III

| Sample No. | B.E.T. Surface Area ($m^2/g$) | Carbon (%) | Nitrogen (%) | Oxygen (%) | Hydrogen (%) |
|---|---|---|---|---|---|
| 1 | 710 | 69.95 +/− 13.74 | 1.373 +/− 0.44 | 26.804 | 1.873 +/− 0.0907 |
| 2 | 853.38 | 92.64 +/− 9.55 | 5.36 +/− 0.846 | 0.63 | 1.37 +/− 0.081 |
| 3 | 807.39 | 65.37 +/− 7.19 | 3.48 +/− 0.415 | 30.241 | 0.909 +/− 0.2 |
| 4 | 1107.48 | 80.25 +/− 2.46 | 4.67 +/− 0.433 | 13.94 | 1.14 +/− 0.086 |
| 5 | 1245 | 87.61 +/− 7.28 | 4.86 +/− 1.12 | 5.76 | 1.77 +/− 0.484 |

The coated fibers may be used for adsorption of acidic, polar, and nonpolar gases. As shown in the adsorption isotherms of FIGS. 1–5, $CO_2$, ethane, acetone, HCl and butane all may be efficaciously adsorbed upon the coated fibers of the present invention. The isotherms of FIGS. 1–5 were prepared by measuring adsorption at room temperature using volumetric techniques (with a Coulter Omnisorb 100) and gravimetrically (using a TGA 951 connected to a TA instruments 2100 system computer and three Tylan General FC-280 mass flow controllers used to dilute standard concentration gas to lower concentration). These results reveal that the activated carbon-coated fibers of the present invention are much more cost-effective per unit weight than conventional activated carbon fibers for removing contaminants.

In another embodiment of the invention, the coated fibers are activated in heated air to produce activated carbon coated fibers have acidic surface chemistry in order to permit the desirable adsorption of small molecules having a basic chemistry. The coated fibers also may be activated by other heated gases, such as argon and carbon dioxide, to produce desirable surface chemistries. These techniques are described more fully in the examples set forth below.

EXAMPLE III

Samples of phenolic-coated glass fiber material, ranging in mass from 0.6–0.9 g, were placed in a tube furnace and heated in air at a flow rate of 210 mL/min, where they were held for five minutes at 400° C., and then heated to 450° C. and held for a predetermine time, as specified in Table IV. The samples then were cooled in argon and held at 200° C. for two hours. The characteristics of the samples are set forth in Table IV.

TABLE IV

| Sample No. | Reaction Time (minutes) | Weight Loss (g) | Original Resin Weight (g) | Activation Yield (%) | B.E.T. Surface Area (m²/g) |
|---|---|---|---|---|---|
| 1 | 15 | 0.0294 | 0.1023 | 71.3 | 196 |
| 2 | 20 | 0.0375 | 0.0974 | 61.5 | 230 |
| 3 | 25 | 0.0365 | 0.0894 | 59.2 | 252 |
| 4 | 37 | 0.0531 | 0.080064 | 33.7 | 452 |
| 5 | 31 | 0.0436 | 0.078672 | 44.6 | 407 |
| 6 | 45 | 0.0559 | 0.066384 | 15.8 | 318 |

The surface area of each of these, samples was measured using nitrogen adsorption techniques at 77° K with a Micromeritrics ASAP 2400 and elemental analysis techniques using a Control Equipment Corp. 240XA elemental analyzer.

EXAMPLE IV

In another embodiment of the invention, the coated glass fibers were activated in argon. A coated fiber assembly was placed in a tube furnace that was purged with argon for ten minutes at a flow rate of 4800 mL/min. The sample was held in the furnace at 200° C. for ten minutes in argon at the same flow rate, and then heated to 600° C. and held at that temperature for 25 minutes. The sample was allowed to cool to room temperature in argon, and then degassed in argon at 200° C. for two hours, producing a coated carbon fiber with a B.E.T. surface area of 641 m²/g.

EXAMPLE V

Phenolic resin-coated glass fiber assemblies were activated in carbon dioxide by placing the fibers in a tube furnace under argon for 50 minutes at a flow rate of 2990 mL/min. The samples then were heated in carbon dioxide a at flow rate of 503 mL/min. to the desired temperature (ranging from 600°–800° C.) for a predetermined length of time. The sample then was cooled in argon and held at 200° C. for approximately 2 hours at a flow rate of 2990 mL/min. This created a porous carbon-coated fiber having the characteristics set forth below in Table V.

TABLE V

| Sample No. From Example I | Reaction Temperature (°C.) | Reaction Time (hrs) | Acitivation Yield | B.E.T. Surface Area (m²/g) |
|---|---|---|---|---|
| 5 | 600 | 1.5 | 62.87 | 744 |
| 10 | 700 | 1.5 | 61.6 | 600 |
| 11 | 800 | 1.5 | 48.47 | 800 |
| 3 | 800 | 3 | 43.2 | 900 |

Fibers made according to the present invention may be regenerated using any of the conventional regeneration techniques, including heating in nitrogen, electrical resistance heating, or other conventional regeneration techniques that do not produce degradation. Low temperature heating of the fiber assembly following contaminant adsorption will return the fiber to its original working capacity so that the fiber assembly may be used again. Purging techniques, by which the contaminant is chemically displaced from the fiber, also may be used to remove contaminants from the samples, but less effectively than the heating techniques mentioned above.

EXAMPLE VI

Novolac solutions were prepared with varying ratios of novolac to hexamethylenetetramine concentrations, to alter the final cross-link density upon curing. These solutions also contained different quantities of solvent (ethanol) to vary the viscosity. Nonwoven fiberglass reinforcement material from Fibre Glast Developments Corp. were impregnated under vacuum using standard vacuum impregnation techniques, to produce coated fibers up to 45% by weight resin. These samples were heated in different air/nitrogen mixtures and reacted at temperatures from 350°–750° C. for a period ranging from several minutes up to one hour.

Accordingly, the activated, coated fiber assemblies of the present invention exhibit notable advantages over conventional activated carbon fibers. First, the wide range of fiber substrate materials that may be used in the present invention offers greater versatility than activated carbon fibers. Second, the starting materials are of far lower cost than conventional materials, and exhibit better mechanical integrity and wear resistance than conventional activated carbon materials. The coated fibers of the invention also exhibit resistance to shrinkage, resulting in higher surface areas and higher yields than conventional activated carbon fibers under similar activation conditions. And the techniques of the present invention make it far easier and less expensive to manufacture and process materials for contaminant removal.

Moreover, the invention is able to produce both coated materials on woven and nonwoven substrates, useful to adsorb contaminants and, as noted above, to catalyze their decomposition Nonwoven materials having a high weight percentage (45–60%) of resin may also be used as filters for extremely fine particulates, germs and molecules, because of their extremely fine pore structure.

Finally, the coated fibers may be used as ion exchange systems, by further processing of the coated fibers. For example, it is believed that the fibers made according to Example I may be heated at about 100° C. in concentrated sulfuric acid under inert conditions to produce a sulfonated coated fabric. Likewise, a fiber assembly could be impregnated with a melamine, oligomeric resin mixture to create an ion exchange coated assembly.

The present invention has been described with respect to certain embodiments and conditions, which are not meant to and should not be construed to limit the invention. Those skilled in the art will understand that variations from the embodiments and conditions described herein may be made without departing from the invention as claimed in the appended claims.

What is claimed is:

1. A method of making a fiber material for adsorption of contaminants, comprising the steps of:
    coating a fiber substrate with a resin;
    cross-linking the resin with a cross-linking agent;
    heating the coated fiber substrate to carbonize the resin; and,
    exposing the coated fiber substrate to an etchant to activate the resin; wherein the fiber substrate comprises glass or mineral, and wherein the fiber material is regenerable by heating.

2. The method of claim 1, wherein the etchant is selected from the group consisting of ammonia, air and one or more inert gases.

3. The method of claim 1, wherein the etchant is an oxidant selected from the group consisting of oxygen, air, carbon dioxide, steam, mixtures of sulfuric and nitric acid, and mixtures of hydrogen peroxide and acetic acid.

4. The method of claim 1, wherein the resin is selected from the group consisting of novolacs, pitch and resols.

5. The method of claim 1, wherein the fiber substrate is woven.

6. The method of claim 1, wherein the fiber substrate is nonwoven.

7. The method of claim 1, wherein the cross-linking agent is selected from the group consisting of hexamethylenetetramine, resols, mixtures of hydrochloric acid and formaldehyde, and air.

8. The method of claim 1, wherein the resin is mixed with a cross-linking agent prior to coating the fiber.

9. The method of claim 1, wherein the fiber substrate is coated with the resin by dip coating.

10. The method of claim 1, wherein the fiber substrate is coated with the resin by spraying.

11. The method of claim 1, wherein the fiber substrate is coated with the resin by vacuum impregnation.

12. The method of claim 1, wherein catalytic metals are added to the resin.

13. The method of claim 1, wherein the resin and the cross-linking agent are mixed with a solvent prior to coating the fiber substrate and wherein the cross-linking agent is selected from the group consisting of hexamethylenetetramine, resols, mixtures of hydrochloric acid and formaldehyde, and air.

14. The method of claim 1, wherein the resin is supplied in the form of a melt of sufficiently low viscosity such that the melt can coat the fiber substrate.

15. The method of claim 1 wherein the method results in fiber materials containing pores with surface chemistry that may be selectively altered.

16. The method of claim 2 wherein the method results in fiber materials containing pores with surface chemistry that may be selectively altered.

17. The method of claim 1 wherein the method may be used to create adsorbent fibers with acidic, basic, polar or neutral pore surface chemistries and having pores ranging in average size from 100 Å to having pores ranging in average size of 7 Å.

18. A coated fiber made according to the method of claim 1.

19. The coated fiber of claim 18 wherein the resin and cross-linking agent are mixed with a solvent prior to coating the fiber substrate and wherein the cross-linking agent is selected from the group consisting of hexamethylenetetramine, resols, mixtures of hydrochloric acid and formaldehyde, and air.

20. The coated fiber of claim 18 wherein the surface of the fiber material comprises pores with surface chemistry that may be selectively altered.

21. The coated fiber of claim 18 wherein the resin further comprises catalytic metals.

22. The coated fiber of claim 18 wherein the resin and the cross-linking agent are mixed with a solvent prior to coating the fiber substrate and wherein the cross-linking agent is selected from the group consisting of hexamethylenetetramine, resols, mixtures of hydrochloric acid and formaldehyde, and air and wherein the etchant is selected from the group consisting of ammonia, air and one or more inert gases and wherein the resin is selected from the group consisting of novolacs, pitch and resols.

23. The coated fiber of claim 19 wherein the wherein the surface of the fiber material comprises pores with surface chemistry that may be selectively altered.

24. A method of making an activated fiber material for the adsorption of contaminants, comprising the steps of:

coating a fiber with a resin;

cross-linking the resin; and simultaneously carbonizing and activating the fiber material by heating the coated and cross-linked fiber in substantially pure nitrogen; wherein the fiber substrate comprises glass or mineral, and wherein the fiber material is regenerable by heating.

25. The fiber material claim 24 wherein the surface of the fiber material contains pores with surface chemistry that may be selectively altered.

26. A method of making a fiber for adsorption of contaminants comprising the steps of:

coating a substrate with a resin;

cross-linking the resin with a cross-linking agent;

carbonizing the resin; and activating the resin with an etchant being selected from the group consisting of ammonia, and air; wherein the fiber substrate comprises glass or mineral, and wherein the fiber material is regenerable by heating.

27. A coated fiber made according to the process of claim 26 wherein the etchant is air and the activation occurs at a temperature of 350° C.–450° C.

* * * * *